Sept. 8, 1931. W. F. LIDKE 1,822,102
BATTERY LIFTER
Filed Sept. 24, 1930
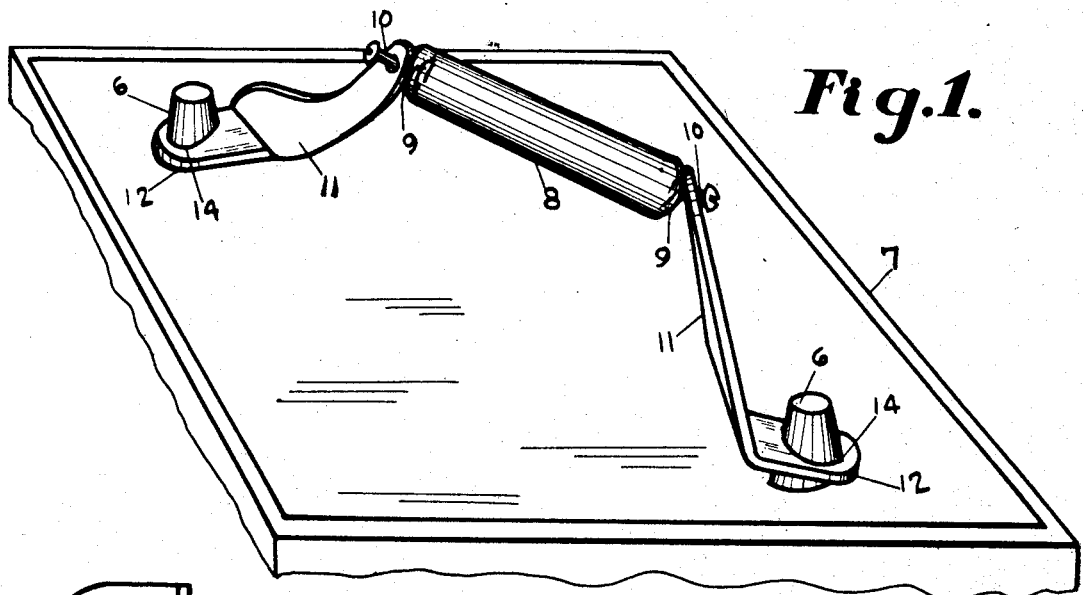
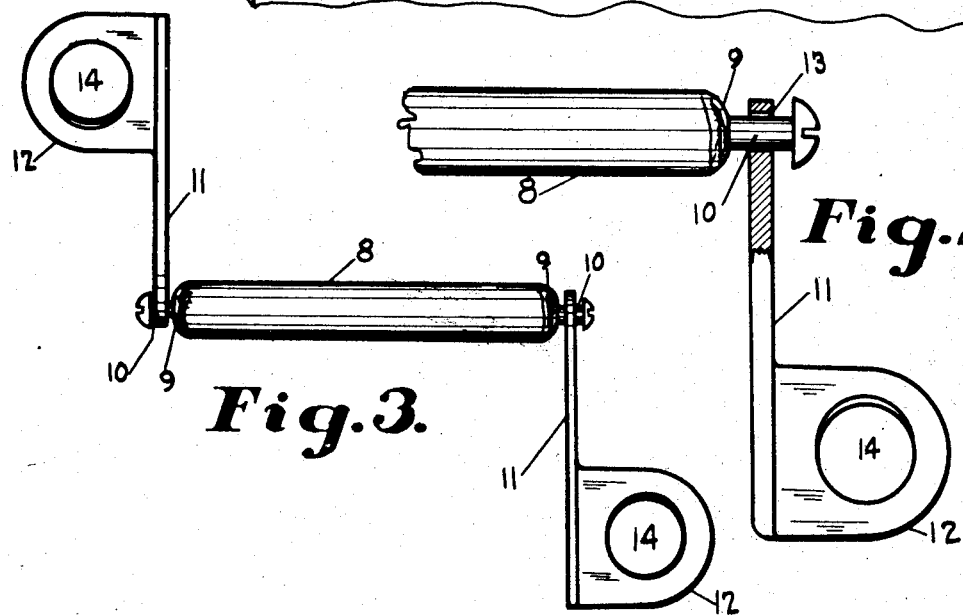
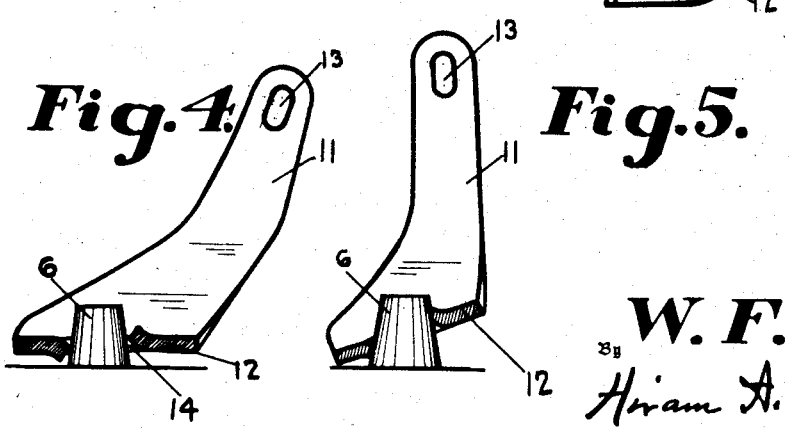
Inventor
W. F. Lidke
By Hiram A. Sturges
Attorney Patented Sept. 8, 1931

1,822,102

UNITED STATES PATENT OFFICE

WILLIAM F. LIDKE, OF OMAHA, NEBRASKA, ASSIGNOR, BY MESNE ASSIGNMENTS, OF ONE-HALF TO THE ELECTRIC STORAGE BATTERY COMPANY, OF PHILADELPHIA, PENNSYLVANIA, A CORPORATION OF NEW JERSEY

BATTERY LIFTER

Application filed September 24, 1930. Serial No. 484,094.

This invention relates to a battery lifter and more particularly to a lifter for batteries used on motor vehicles which are provided with a pair of upwardly tapered posts, these being electrically charged and in communication with the battery terminals.

Since it is generally necessary to remove electric batteries from automobiles to permit charging or repairs, and since they are not usually provided with handles, the lifter herein described has been found to be very convenient for their removal and replacement.

Since the posts mentioned for electric batteries of various kinds of automobiles are not disposed at uniform distances from each other, it is an object of the present invention to provide a battery lifter which may be used generally and of such construction that it will operate automatically in gripping the parts to permit lifting regardless of the spacing apart of said posts, and will operate automatically for releasing the posts when replacing the batteries.

It is an object of the invention to provide a battery lifter which will consist of few and simple parts so that it may be manufactured conveniently and at a limited cost, and will be convenient and effective in use for removal from motor vehicles and replacement therein.

With the foregoing objects in view and others to be mentioned herein the invention presents a new and useful construction, combination and arrangement of parts as described herein and claimed and as illustrated in the accompanying drawings, it being understood that changes may be made in form, size, porportion and minor details, said changes being within the scope of the invention as claimed.

In the drawings, Fig. 1 is a perspective view showing the upper part of an electric battery, the battery lifter being shown in engagement with the posts of the battery. Fig. 2 is a side view of the handle, broken away, the lifting arm being in a normal vertical positon. Fig. 3 is a plan view of the device, the arms being extended. Fig. 4 is a perspective view showing the front side of a lifting-arm with its clamping-member, in section, loosely mounted on a post. Fig. 5 is a similar view to that shown in Fig. 4, the clamping-member, in section, being in gripped position on said post.

Referring now to the drawings for a more particular description, the invention is shown and described in connection with a pair of electrical posts 6 which project above the surface of the electric battery 7. In order that the objects as first mentioned may be attained, I provide a battery lifter consisting of a handle 8 having end-portions 9 of convex form, and provided, to project outwardly from said end-portions centrally thereof with wrist-pins 10. Numerals 11 indicate a pair of lifting arms each provided at its free end with a flat foot-piece or gripping-member 12, each arm 11 having a comparatively large aperture 13 of elongated form for a mounting on a wrist-pin 10.

Each gripping-member or foot-piece 12 is provided with a circular aperture 14 of such proportions that it will fit loosely on either one of the posts 6 when placed thereon. The arms 11 are preferably of uniform length and proportion and it will be noted that each flat clamping-member 12 is disposed inclinedly to the longitudinal axis of the arm of which it is a part, the degree of said inclination being approximately forty-five degrees.

While electric batteries used upon the several kinds of automobiles manufactured are not uniform in size and form, the posts similar to the posts 6 shown in the drawing are used, and since the distance between the posts is not uniform it will be seen that the construction now shown operates to advantage in gripping the posts found upon the various kinds of electric batteries now used.

On account of the construction as described it may be said that the device is flexible. The parts which are mounted on the posts may swing freely from the convex ends of the handle, the apertures 13 in the ends of the arms 11 which receive the wrist-pins 10 being of ample size as compared with the diameters of said pins to permit said arms to swing outwardly so that the clamping-members 12 may be placed on posts 6 disposed at various distances from each other.

In the use of the device for removing an electric battery an operator may grasp the handle with a single hand and remove the battery. It will be seen that the clamping-members 12 will readily slide downwardly upon the posts and that, when elevating the device, by use of the handle, the clamping-members 12 will automatically grip the posts for the reason that the upward movement of the handle will cause the stresses to be directed at an inclination approximately of forty five degrees to the axes of the posts 6, which cause the walls of the apertures 14 to grip the opposed sides of the posts.

When replacing the battery the clamping-members 12 will become automatically released from the posts as soon as the handle is lowered or moved downwardly toward the surface of the battery.

Since the clamping-members 12 are of attenuated form the edges of the apertures 14 will readily grip the sides of the cylindrical posts.

It will be noted that the clamping-members 12 project outwardly from each other, and this feature facilitates the operation of gripping the posts when elevating the handle, and facilitates release of the gripping-members when the handle is lowered.

While the device has been shown and described as a battery lifter it may, of course, be used for lifting many other articles having upwardly projecting prongs or posts, and while a specific construction has been shown for the mounting of the arms 11 upon the ends of the handle 8, any flexible connection of these parts may be employed which will permit swinging movements of the arms either longitudinally or transversely of the handle, and on this account together with the fact that the holder-plates 12 are inclined to both the longitudinal and transverse axes of the arms 11, the device operates to great advantage.

Any suitable material may be used in constructing the handles 8, but generally electrical non-conducting material is used for this purpose.

I claim as my invention,—

1. A battery lifter comprising a handle, a pair of arms pivotally mounted in the ends of the handle, each arm having an apertured gripping plate extending at approximately right angles therefrom and having an inclination oblique to the longitudinal axis of said arm.

2. A battery lifter comprising a handle, a pair of arms pivotally mounted on the handle, each arm having an apertured gripping plate extending transversely therefrom and having an inclination oblique to the longitudinal axis of said arm.

3. A battery lifter comprising a handle, a pair of arms pivotally mounted on said handle, each arm having an apertured gripping plate extending outwardly from its side with an inclination oblique to the longitudinal axis of said arm, the outwardly extending gripping plates of said arms being in directions opposed to each other.

In testimony whereof, I affix my signature.

WM. F. LIDKE.